United States Patent [19]
Lilly et al.

[11] 3,753,286
[45] Aug. 21, 1973

[54] LOW SPEED FRICTION WELDING

[75] Inventors: Rodger H. Lilly, Cambridge; Colin R. G. Ellis, Newton, both of England

[73] Assignee: The British Aluminum Company, Limited, London, England

[22] Filed: Aug. 5, 1970

[21] Appl. No.: 61,076

[30] Foreign Application Priority Data
Apr. 11, 1970 Great Britain.................. 17,776/70
Aug. 21, 1969 Great Britain.................. 39,919/69

[52] U.S. Cl.................... 29/470.3, 156/73, 228/2
[51] Int. Cl......................................... B23k 27/00
[58] Field of Search.................. 29/470.3; 228/2; 156/73

[56] References Cited
UNITED STATES PATENTS
3,175,284  3/1965  Cotovsky.......................... 29/470.3
3,235,162  2/1966  Hollander......................... 29/470.3

Primary Examiner—Robert D. Baldwin
Assistant Examiner—Robert J. Craig
Attorney—Peck and Peck

[57] ABSTRACT

This disclosure relates to the friction welding of dissimilar metals, and provides a method of friction welding together two faces of two members formed of dissimilar metals, the method comprises causing relative rotation between the two faces while applying load between the two faces in a direction axial of the rotation and maintaining that axial load and rotation for a determined period of time, wherein the maximum relative velocity between the faces during the rotation is below 60 centimeters per second.

18 Claims, 32 Drawing Figures

PRIOR ART DATA ON FRICTION WELDING

FIG. 10a.
40 r.p.m.
34 cm/sec.

FIG. 11a.
50 r.p.m
43.4 cm/sec.

FIG. 12a.
60 r.p.m.
52.1 cm/sec.

FIG. 13a.
70 r.p.m.
60.8 cm/sec.

FIG. 14a.
80 r.p.m.
69.5 cm/sec.

FIG.10b.
40 r.p.m.
34 cm/sec.

FIG.11b.
50 r.p.m.
43.4 cm/sec.

FIG.12b.
60 r.p.m.
52.1 cm/sec.

FIG.13b.
70 r.p.m.
60.8 cm/sec.

FIG.14b.
80 r.p.m.
69.5 cm/sec.

FIG.10c.
40 r.p.m.
34 cm/sec.

FIG.11c.
50 r.p.m.
43·4 cm/sec.

FIG.12c.
60 r.p.m.
52·1 cm/sec.

FIG.13c.
70 r.p.m.
60·8 cm/sec.

FIG.14c.
80 r.p.m.
69·5 cm/sec.

LOW SPEED FRICTION WELDING

BACKGROUND OF INVENTION

This invention relates to the friction welding of dissimilar metals, and is particularly, although not exclusively, concerned with the friction welding of aluminium alloys to steels.

The general principles of friction welding technique to which the present invention relates comprise causing a relative rotation between the faces of two items to be welded together while applying a relative load between the two items in a direction which is axial of the rotation, so that heat is produced at the interface of the two components by friction. If the axial friction load and relative rotational speed, together with the time for which relative rotation is continued are suitably controlled, a bond may be formed between the faces of the two members to be welded.

Apart from the axial friction load applied during relative rotation, it has been found that it is desirable to apply a forging or upsetting axial load after the bond between two components to be welded has been formed and the relative rotation has ceased. This forging load has the effect of improving the bond formed by the welding operation and enhancing its qualities.

In such friction welding techniques, when applied to the welding of dissimilar materials, particularly aluminium alloy and steel, intermetallics are formed at the interface between the two members, and in previously proposed methods, such intermetallics have occurred between dissimilar materials to such an extent in some instances as to seriously reduce the mechanical strength and ductility of the joint.

In the research resulting in the present invention it has been found that by carefully controlling the various parameters of a friction welding method, in a manner heretofore thought unacceptable, it is possible to limit the formation of intermetallics at the interface between two members to be joined while still maintaining a sufficient interaction between the two members, thus to produce a satisfactory high strength joint between them.

One field of application where the invention find particular use, is in the manufacture of electrode assemblies for use in aluminium smelters. In aluminium smelters, it has been proposed to use anode electrode assemblies which each comprise a steel billet which may be some 8 inches in diameter and 2 feet long, joined at one end to an extruded or cast aluminium bar which may be some 4 inches square in cross-section, and joined at the other end to a carbon anode member, cast iron being used as a bonding agent between the steel and the carbon. The whole anode assembly may be some 8 to 10 feet long, and in use the carbon anode member is inserted into an aluminium ore reduction cell with the aluminium alloy bar being clamped to an overhead aluminium electrical bus-bar.

It is important, that the joint between the steel billet and the aluminium alloy bar should have a low and consistent electrical resistance, while having sufficient mechanical strength to support the weight of the steel billet and the carbon anode member, which last may alone be of the order of some 1,500 pounds. Further it is important that the joint between the steel billet and the aluminium alloy bar is sufficiently ductile to withstand distortions of the anode assembly which may occur in operation of the reduction cell, and to withstand loads imposed upon the structure during the removal of spent carbon anode members which are generally broken off the anode assembly.

In the past, the joints between such steel billets and associated aluminium alloy bars have been formed as wholly mechanical clamped joints, and more recently formed using welding techniques in conjunction with mechanical clamped joints. However, the methods adopted for joining the steel billets to the aluminium alloy bars so far proposed have proved time-consuming in practice and consequently expensive.

It is therefore an object of the present invention to provide a method of friction welding together members formed of dissimilar metals, which method is particularly although not exclusively, applicable to the welding of steel billets and the extruded aluminium alloy bars of the anode assemblies discussed above. In pursuance of that object, it is a subsidiary object of the present invention to provide a method of friction welding two dissimilar metals which achieve high quality joints having low and consistent electrical resistance while having good mechanical strength and being ductile.

SUMMARY OF INVENTION

Accordingly the present invention provides a method of friction welding together faces of two members formed of dissimilar metals comprising causing relative rotation between the two faces while applying a load between the two faces in a direction axial of the rotation and maintaining that axial load and rotation for a determined period of time, wherein the maximum relative velocity between the faces during the rotation is below sixty centimetres per second.

In one aspect the present invention provides method according to the preceding paragraph wherein said maximum relative velocity is in the range of 30 to 60 centimetres per second.

In a further aspect the present invention provides a method of friction welding together a face of an aluminium alloy member and a face of a steel member comprising causing relative rotation between the two faces while applying load between the two faces in a direction axial of the rotation and maintaining that axial load and rotation for a determined period of time, wherein the maximum relative velocity between the faces during the rotation is in the range of 30 to 60 centimetres per second.

BRIEF DESCRIPTION OF THE DRAWINGS

In order to promote a fuller understanding of the above, and other aspects, of the present invention methods of the present invention as applied to the friction welding of aluminium alloy to steel, will now be described, by way of example only, with reference to the accompanying drawings in which:

FIGS. 5 and 5a.

FIGS. 8 and 8a.

FIGS. 10a, 10b, and 10c; FIGS. 11a, 11b and 11c; FIGS. 12a, 12b, and 12c; FIGS. 13a, 13b and 13c.

DESCRIPTION OF PREFERRED EMBODIMENTS

Figure 1:
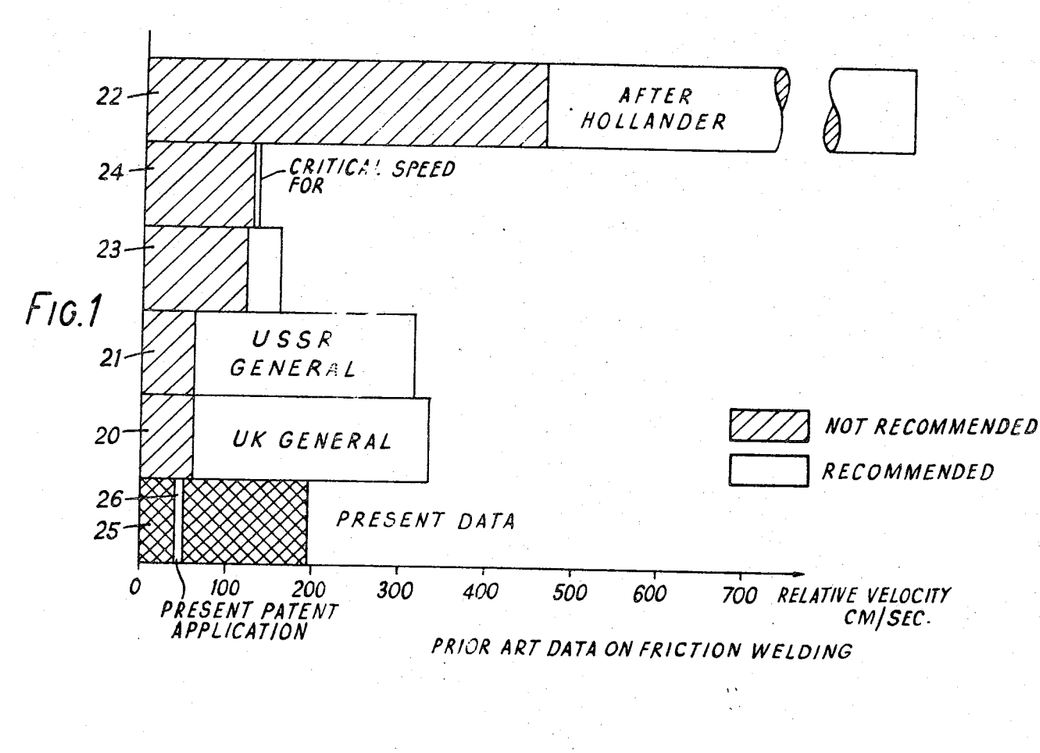
FIG. 1 is a block graphical representation of a particular parameter of previously proposed friction welding techniques and that parameter in the exemplary methods of the invention.

FIG. 1 shows graphically the ranges of values proposed and used for one parameter in previous friction welding methods. This parameter is the maximum relative velocity during rotation between the surfaces of the two members to be joined, that is to say, the relative velocity between the two surfaces at a point on the maximum radius from the axis of the relative rotation in the two surfaces to be joined. In FIG. 1, there is a horizontal scale showing the maximum relative velocity parameter in centimetres per second and above this are a series of block outlines showing ranges of the maximum relative velocity parameter recommended as suitable or unsuitable for friction welding by various authorities. The ranges of velocity parameter previously recommended as suitable are shown in open block outline, while those ranges which are considered as unsuitable are shown in shaded outline. The ranges generally held to be acceptable in the United Kingdom are shown at 20, those generally accepted in the U.S.S.R. are shown at 21, while ranges proposed by Hollander[1] are shown at 22. These ranges recommended by Shternin[2] and Prokofiev[3] in the U.S.S.R. for the friction welding of aluminium to steel and copper are shown at 23 while the ranges proposed by Oberle[4] for the friction welding of aluminium to aluminium are shown at 24.

It will be noted that the above ranges shown in FIG. 1 all have a common area ranging from 0 to 60 centimetres per second for the maximum relative velocity in which welding is not recommended, and in fact all the authorities have heretofore generally recommended far higher relative velocities than 60 centimetres per second.

At the bottom of FIG. 1, a range extending from 0 to nearly 200 centimetres per second maximum relative velocity, is shown cross-hatched at 25 and indicates the range of maximum relative velocities covered by the research resulting in the present invention. Within the range 25 there is a narrow range indicated at 26 and shown in open block, which is appreciably below the minimum values for the relative velocity previously considered acceptable, in which it is found that beneficial results can be obtained, and with which the present invention is concerned. The range 26 extends from 30 to 60 centimetres per second.

It should be noted that throughout this specification, where reference has been made to various parameters particularly the maximum relative velocity parameter, and the area of the welded surfaces, these are based on the original dimensions of the faces to be welded and ignore any local extrusions, protruberances or flashing which may be formed at the periphery of the welded faces.

Figure 2:
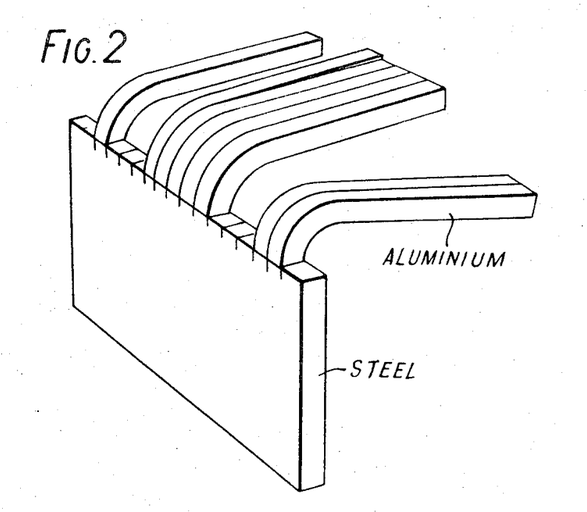
FIG. 2 is a perspective view of a sample weld used to provide an assessment of bond quality.

In the research resulting in the invention, it was necessary to establish a standard of comparison of the quality of bond between the surfaces of two members friction welded together. The bond was evaluated by cutting out a 6 millimetre wide slice which is diametrical to and includes the axis of relative rotation, across the interface of two welded members, and then making a series of longitudinal (in relation to the axis of rotation during welding) saw cuts right through one of the members which have been welded and a short distance into the other member so as to produce a series of segments which were some 6 millimetres square in cross-section. The segments of the one member which in experiments in welding aluminium alloys to steel is chosen as the aluminium member, were then bent over by hammering as illustrated in FIG. 2. The bending over of the segments was considered to be a good test of the quality of the bond between the two members and this quality was assessed as a percentage by measuring the bonded length, that is to say, the total number of segments which could be bent through 90° without failure of the bond, and expressing the area of the surface of revolution which would be formed by that length about the axis of the relative rotation during welding as a percentage of the original cross-section area of the aluminium alloy billet.

As a large number of the experiments were concerned with a square cross-section aluminium alloy billet being friction welded to an end surface of a steel billet, the diametrical slice was taken diagonally through the aluminium alloy billet and in many cases both for square and round billets the slide includes portions taken through local protruberances formed around the periphery of the weld; some of the percentage bonds appearing in the experimental results discussed below exceed one hundred percent.

It was considered that a percentage bond assessed on this basis, of 80 percent would provide a satisfactory bond between two members.

Figure 3:
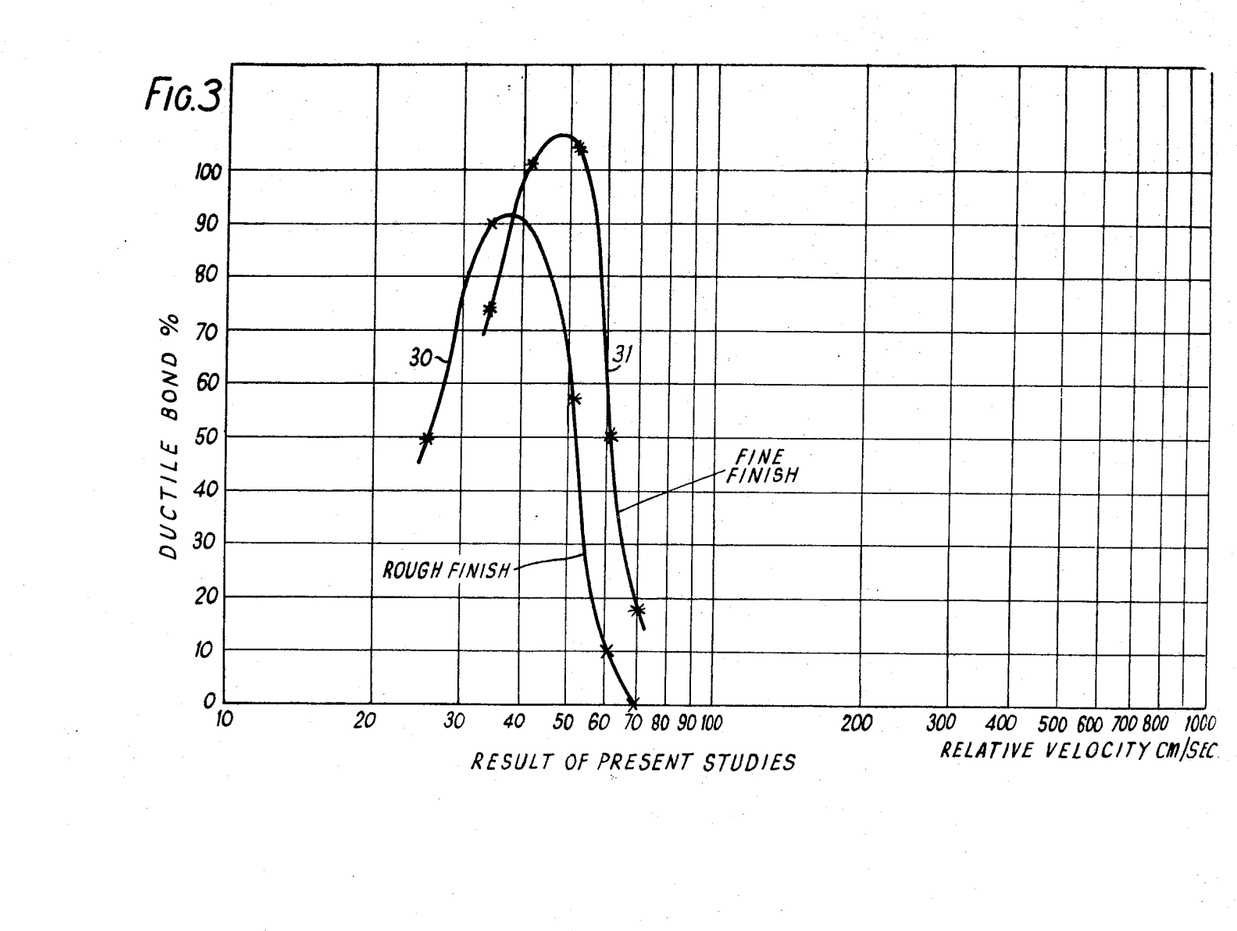
FIG. 3 is a graph showing percentage bond plotted against one parameter of the welding technique for different values of a second parameter.

FIG. 3 shows graphically the variation, in welding aluminium alloy to steel of percentage bond achieved on a vertical scale plotted against the values of the maximum relative velocity parameter used in achieving that bond in an experimental weld, plotted along the horizontal axis. A first curve 30 shows the plot achieved from experiments in which the welded faces were in a comparatively rough initial condition before welding (the steel member being dry turned to 63μins CLA surface finish and the aluminium member being BA 24 alloy (HE9-BS-1476) wet sawn, neither surface being degreased). A second curve 31 shows the bonds achieved with the welded faces having a comparativey fine surface finish in their initial condition (the steel member being ground and the aluminium member being BA 24 freshly turned, both surfaces being degreased).

From the curves shown in FIG. 3, it can be seen that in order to achieve an acceptable bond percentage (i.e., above 80 percent) in the rough condition maximum relative velocities of some 30–45 centimetres per second should be used with an optimum bond being achieved at some 37 centimetres per second, whereas with a fine surface finish, maximum relative velocities of some 36–58 centimetres per second should be utilised with an optimum bond being achieved at some 48 centimetres per second.

It will be noted that the use of values of the maximum relative velocity parameter within the range of the invention enables satisfactory welds to be achieved with an initially rough surface finish on the faces of components to be welded. The tendency is for satisfactory welds made at higher values for the maximum relative velocity parameter to involve a finer initial surface finish on the faces of the components. Thus it may be realised that the use of methods within the scope of the invention can offer a reduced cost for the preparation of components prior to welding.

instance the optimum percentage bond is obtained with a maximum relative velocity parameter value of some 55 centimetres per second.

Table 1 shows a range of values for the maximum relative velocity parameters, the friction load, the forging load, the friction load/unit area of the weld, the forging load/unit area of the weld, and "burn-off distance" (that is to say the axial relative feed between the components during welding); for different sized aluminium alloy (BA24) bars being successfully friction welded to a steel member. It will be noted that in each case the forging load is of the order of four times the friction load.

TABLE I.—PARAMETER VALUES FOR THE WELDING OF ALUMINIUM ALLOY SAMPLES TO STEEL

| Aluminium alloy cross-section, mm. dia. | Max. relative velocity para., cm./sec. | Friction load (max.), tons | Forging load, tons | Friction load unit area, tons/sq. cm. | Forging load unit area, tons/sq. cm. | "Burn off distance," mm. |
|---|---|---|---|---|---|---|
| 75 | 59 | 10 | 40 | .227 | .908 | 4 |
| 100 | 59 | 18 | 72 | .229 | .918 | 15 |
| 125 | 59 | 25 | 100 | .204 | .816 | 20 |

Figure 4:
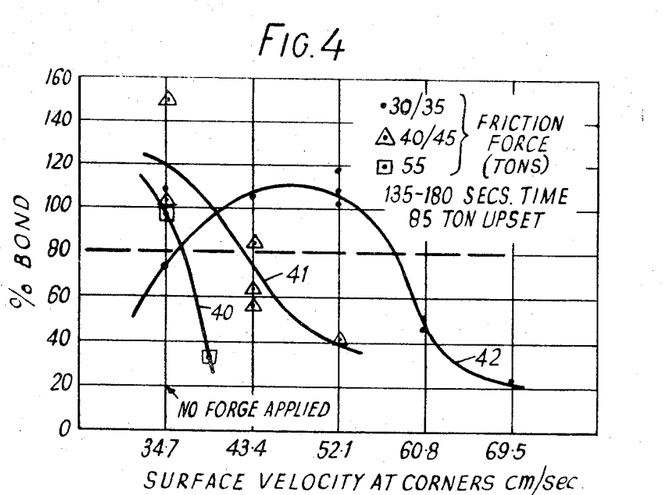
FIG. 4 is a graph showing percentage bond plotted against the same one parameter as FIG. 3 for different values of a third parameter.

FIG. 4 is a generally similar family of curves to FIG. 3, showing the percentage bond achieved with different relative velocity parameter values only for three different values of the parameter of axial friction load applied between the end faces of a 4½ inch by 4¾ inch bar of BA 24 aluminium alloy and a 7 inch diameter bar of steel during welding. Curve 40 in FIG. 4 shows the percentage bonds achieved with an axial frictional load of some 55 tons, curve 41 shows the percentage bonds achieved with an axial frictional load some 40–45 tons, and curve 42 shows the percentage bonds achieved with an axial frictional load of some 30–35 tons. In each instance of FIG. 4 an upsetting or forging bond of some 85 tons was applied axially after the bond had been formed, and the "burn off" or welding time of relative rotation was in the range of 135 to 180 seconds.

Again, it will be seen that the acceptable percentage bonds are achieved with values of the maximum relative velocity parameter of considerably below 60 centimetres per second; that is to say below 37 centimetres per second with a frictional load of some 55 tons and below 42 centimetres per second with a frictional load of some 40–45 tons, whereas in the case where the axial friction load is of the order of 30–35 tons acceptable bond percentages are achieved with a maximum relative velocity parameter in the range of 36 centimeters per second to some 57 centimetres per second, (still below 60 centimetres per second); and even in the last FIGS. 5a, 5, 6, 6a, 7, 7a, 8, 8a and 9, 9a show in pairs the opposite fracture faces of a series of square cross-section aluminium alloy billets and steel billets which have been friction welded together and have subsequently been fractured apart at the interface between them by bending about that interface; the aluminium billet in each of the pairs of Figures being given the suffix a.

The various parameter values adopted in the friction welding of the members shown in FIGS. 5 to 9 are set out in Table II.

TABLE II.—RESULTS OF BEND TESTS ON FRICTION WELDED ASSEMBLIES

| Fig. No. | Relative rotational speed (r.p.m.) | Maximum relative velocity (at corners), cm./sec. | Max. axial friction load (tons) during welding | Burn off time (secs.) | Max. axial forging load (tons) | Surface conditions (see note) | Max. bend load, lbs. ft. |
|---|---|---|---|---|---|---|---|
| 5 | 50 | 43.4 | 30 | 165 | 85 | A | 98,500 |
| 6 | 50 | 43.4 | 30 | 165 | 86 | B | 86,250 |
| 7 | 60 | 52.1 | 30 | 150 | 85 | A | 94,000 |
| 8 | 70 | 60.8 | 30 | 150 | 85 | A | 63,500 |
| 9 | 80 | 69.5 | 30 | 150 | 85 | A | 68,000 |

NOTE.—Failure only after reverse bending.
Surface conditions:
A—mild steel, dry turned to 125 CLA, degreased Al alloy, wet sawn, not degreased.
B—mild steel, dry turned to 63 CLA, degreased Al alloy, wet sawn, not degreased.

Figure 5:
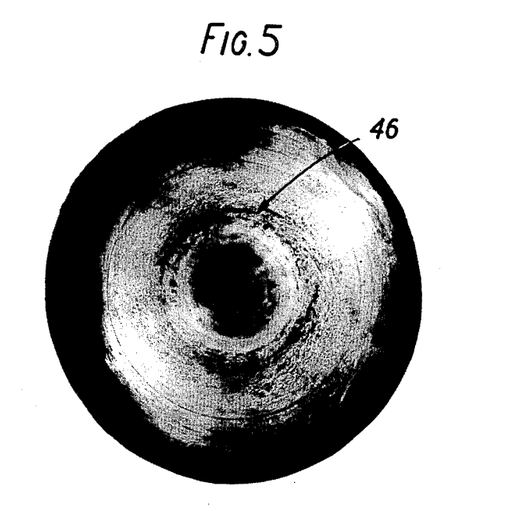
Figure 5A:
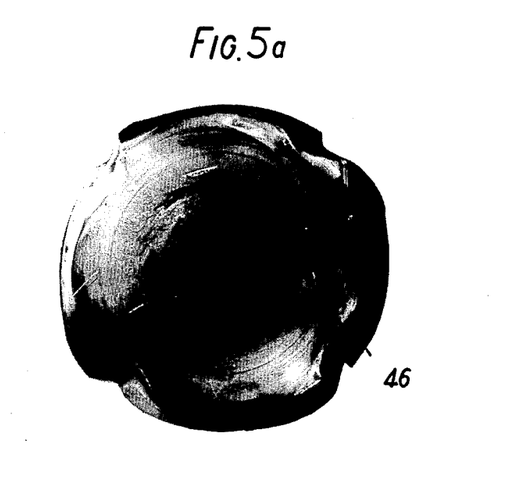
Figure 6:
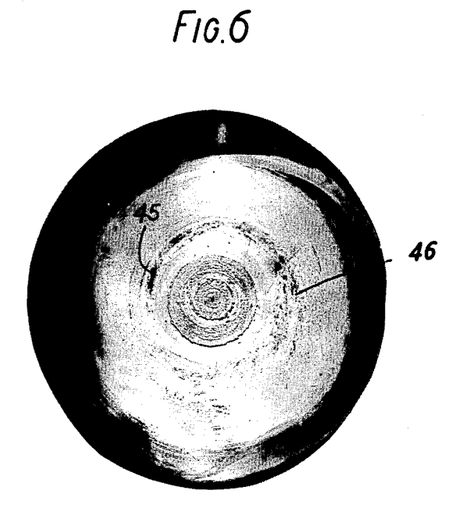
FIGS. 6 and 6a, and FIGS. 7 and 7a show opposite fracture faces of good welds produced by a method in accordance with the invention.
Figure 6A:
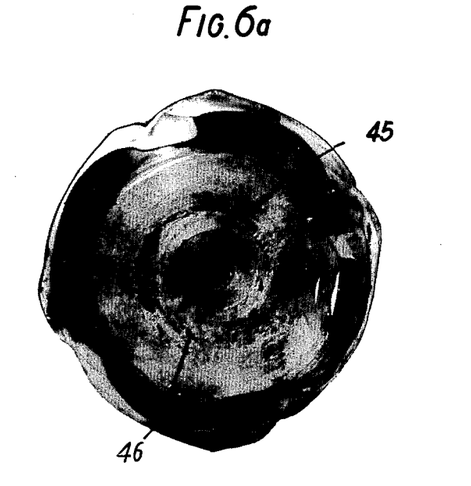
Figure 7:
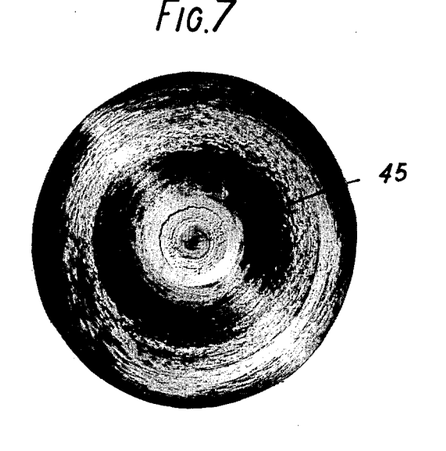
Figure 7A:
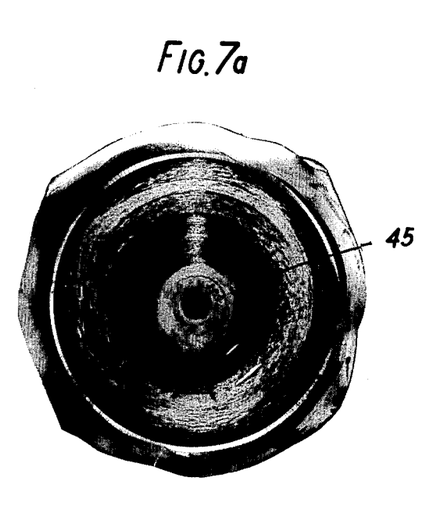
Figure 8:
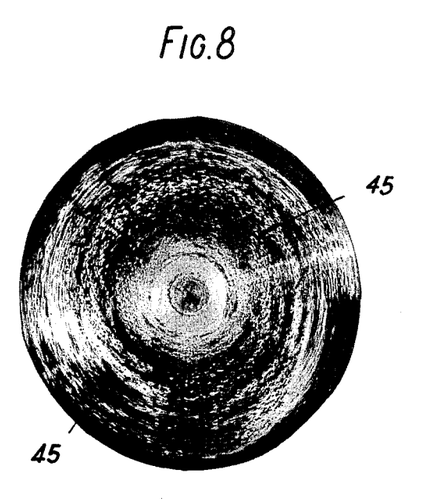
Figure 8A:
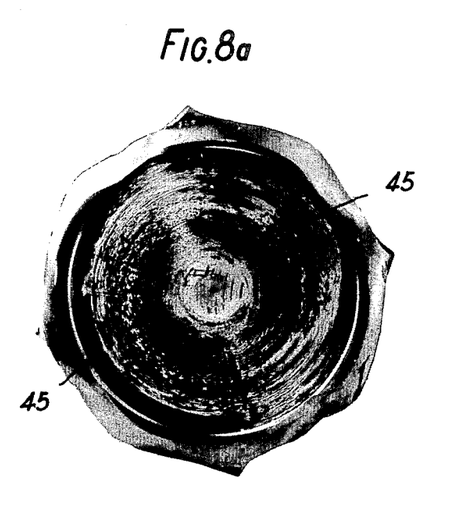
Figure 9:
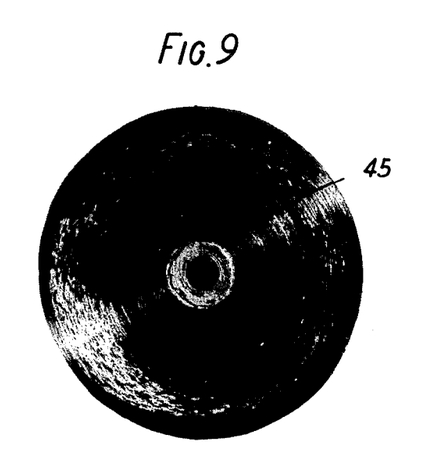
FIGS. 9 and 9a show opposite fracture faces of unacceptable welds produced by a method falling outside the scope of the invention.
Figure 9A:
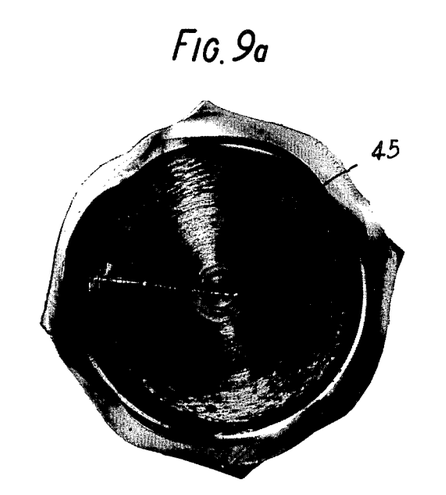
Figure 10A:
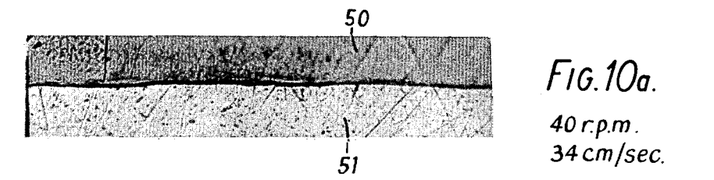
Figure 10B:
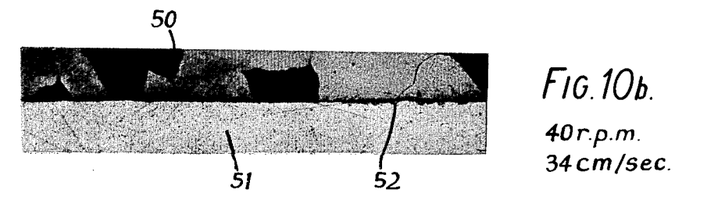
Figure 10C:
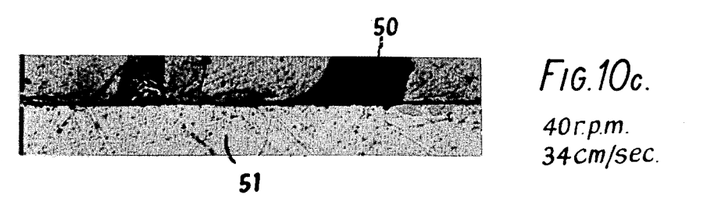
Figure 11A:
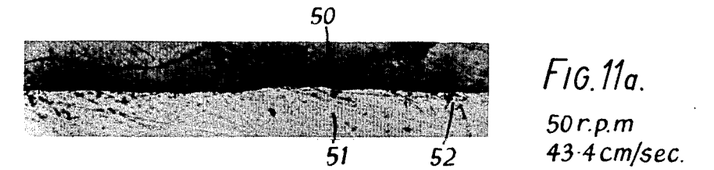
Figure 11B:
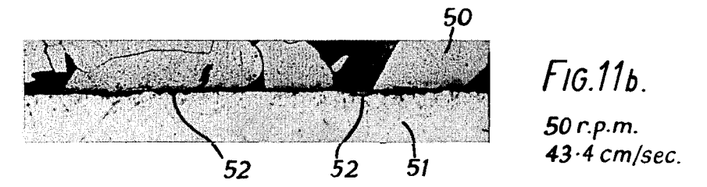
Figure 11C:
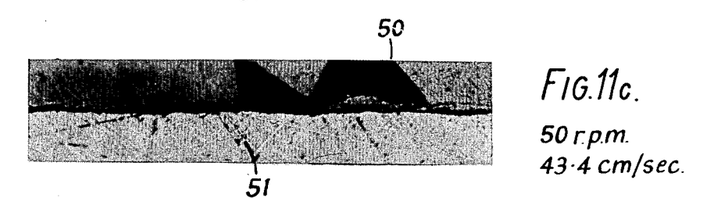
Figure 12A:
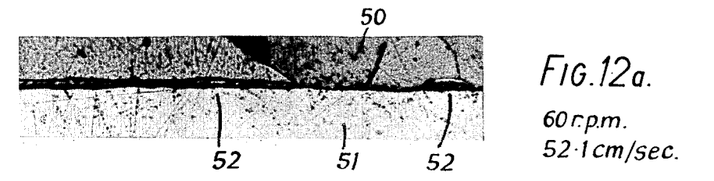
Figure 12B:
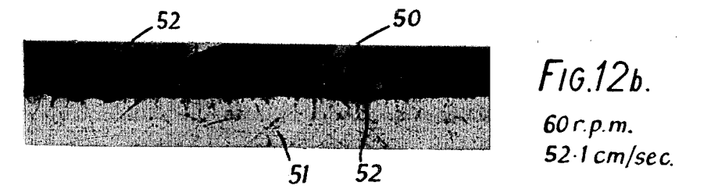
Figure 12C:
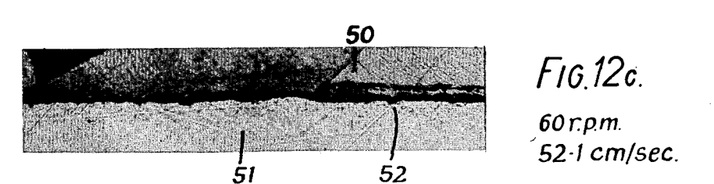
Figure 13A:
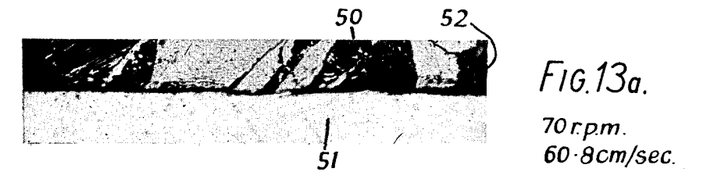
Figure 13B:
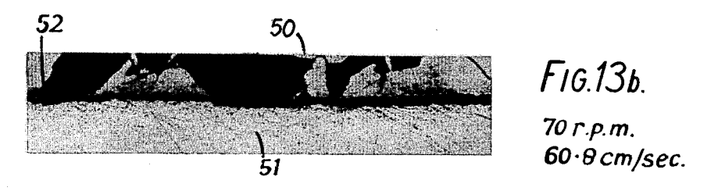
Figure 13C:
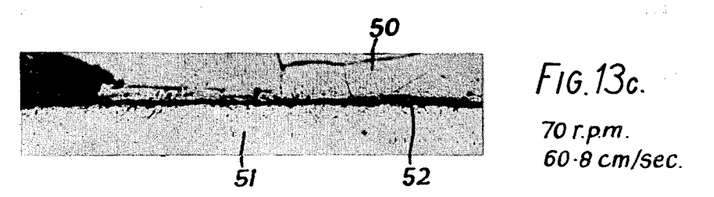
Figure 14A:
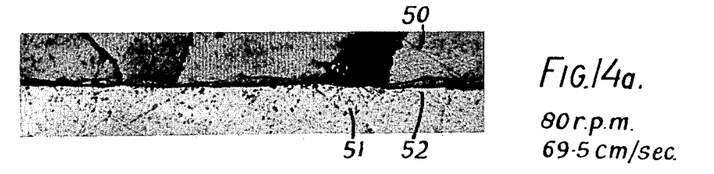
FIGS. 14a, 14b and 14c, show magnified views of the micro-structure across different points of welds made under different welding conditions.
Figure 14B:
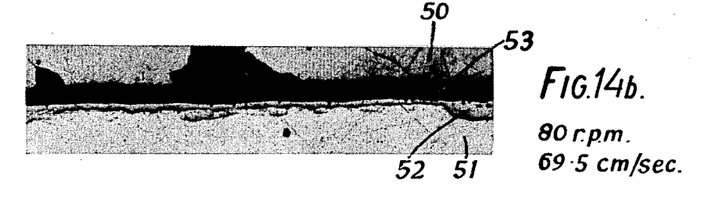
Figure 14C:
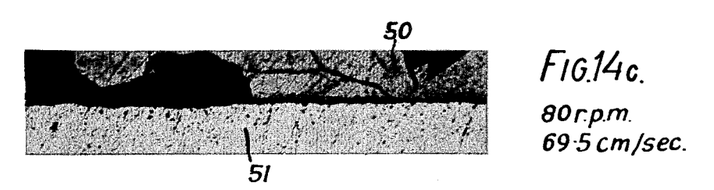

In the final column of Table II there is shown the bending load which was applied across the weld in each case to cause the fracture. It will be noted that the examples shown in FIGS. 5, 6 and 7 are markedly better than those shown in FIGS. 8 and 9 and that this division of quality corresponds also to the division in the values of the maximum relative velocity parameter adopted in each case. The superior strength of welds being achieved with values for the maximum relative velocity parameter of 43.4 centimetres per second, and 52.1 centimetres per second.

In each of the FIGS. 5 to 9 the regions where intermetallics have been formed to such an extent as to break down the strength of the bond, are the darker areas and have been indicated typically at 45; and the darker specks indicated typically at 46 within the lighter areas which last indicate good bonds. It will be appreciated that these darker areas and specks are markedly reduced in the welds made with the lower values of maximum velocity parameter within the range of the invention.

FIGS. 10a, 10b, 10c, 11a, 11b, 11c, 12a, 12b, 12c, 13a, 13b, 13c, 14a, 14b, 14c show magnified etched microstructure views taken across the interface between aluminium alloy members friction welded to steel members with the value of the maximum relative velocity parameter being 34 centimetres per second, 43.4 centimetres per second, 52.1 centimetres per second, 60.8 centimetres per second, 52.1 centimetres per second, 60.8 centimetres per second and 69.5 centimetres per second in FIGS. 10, 11, 12, 13 and 14 respectively. The Figures with the suffix a show cross-sections taken at or near the axis of rotation during welding at a magnification of 1,000; the Figures with the suffix c show the cross-section taken at the maximum radius of relative rotation that is to say, at the corners of the square cross-section aluminium member, at a magnification of 500; and the Figures with the suffix b show cross-sections taken at the mid-point between the axis of relative rotation and the maximum radius of relative rotation at a magnification of 1,000. In each of the FIGS. 10 to 14, the steel member is indicated at 50 whereas the aluminium member is indicated at 51 and the formation of intermetallics at the interface is shown in the regions indicated at 52. Again it will be seen immediately that the formation of intermetallics is considerably increased with the higher relative velocity parameter values, while reduced to a minimum and restricted to small areas of the interface with the lower relative velocity parameter values within the range of the invention as illustrated particularly in FIGS. 10, 11 and 12. It should be particularly noted that in the samples shown in FIGS. 13 and 14 there are large formations of intermetallics extending, at least locally to considerable depth into the parent metal, and in some instances, particularly in FIG. 14b, the formation of intermetallics has been sufficient to allow brittle fracture locally between the welded members as indicated by the very dark area 53.

Figure 15:
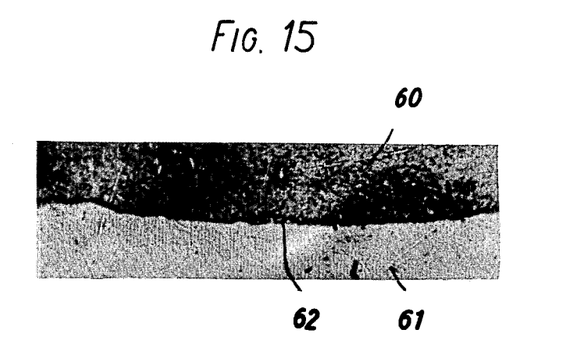
FIGS. 15 and 16 show magnified views (unetched) of the micro structure across welds made under different welding conditions.
Figure 16:
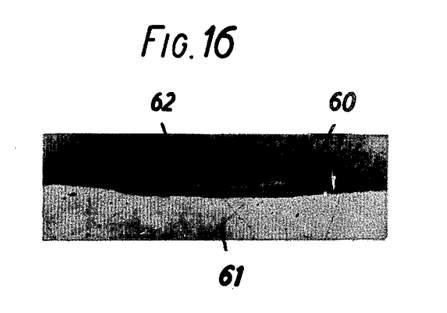

FIGS. 15 and 16 show magnified unetched microstructure views taken across the welded, interface between an 18/8 stainless steel member indicated at 60 and a zirconium 2½ percent Niobium alloy member indicated at 61 with maximum relative velocity parameter values of 42 cm/sec and 162 cm/sec respectively. FIG. 15 is shown at a magnification of 1,000 and FIG. 16 is shown at a magnification of 500, both sections being taken at a similar radial distance in the weld. Again it can be seen that with a maximum relative velocity parameter value of 42 cm/sec within the range of the invention (FIG. 15) the formation of intermetallics indicated at 62 is significantly reduced, in depth (some 2$\mu$) and limited to small areas across the interface, as opposed to the case with a higher value of 162/cm/sec (FIG. 16) where the formation of intermetallics 62 is extensive and reaching to a depth of 20$\mu$.

It is considered that the invention may similarly be applied to the friction welding of stainless steels, carbon steels, alloy steel and heat resisting nickle-chrome alloys such as "Nimonics" to Titanium and Titanium alloys as well as Zirconium and Zirconium alloys and similar metals and alloys.

It is to be noted that if adequate bond strengths are to be achieved, the formation of intermetallics should preferably not extend to a depth of more than 10 microns over any significant area of the interface, and should more preferably be limited to a depth of some 2 microns over any large areas. It is thought that a possible explanation of this is that with a sufficiently thin layer of intermetallics, the natural surface roughness of the joined members leads to areas or volumes of the intermetallics layer being in shear stress, (under Load), between side facets of the rough surfaces of the members, rather than in tensile stress between abutting facets. As may be seen from FIGS. 10 to 14, these limitations on intermetallic thickness are largely achieved only with the maximum relative velocity parameter within the range of the invention.

The reasons for the reduction of thickness of intermetallic compound formed during the welding operation at the lower values of the maximum relative velocity parameter have not been fully established, but it is believed that the rate of heat input at these low speeds is sufficient to lower the interface temperature to a value below some undetermined threshold, above which, intermetallic compound formation occurs at an undesirable rate. The low speeds may also change the deformation mode from a laminar nature, with a boundary film of aluminium permanently attached to the steel, to a moving interface condition which produces break up and wear of intermetallic compound at some rate near to its rate of formation.

Within the range of the invention for the maximum relative velocity parameter the torque developed is high and the shear forces are comparable with the applied axial shear stress so that a major scavenging of the region of the weld interface is obtained. At the heretofore recommended values of the maximum relative velocity parameter this condition is not obtained and a relatively stagnant layer tends to be developed adjacent to the stonger material. In the stagnant layer, where there is not a gross scavenging, the intermetallic zone develops to such thicknesses and extent across the interface that the joint strength is severely impaired.

In the early stages (before the friction interface is fully developed) a snatching torque takes place. In order to reduce the transient torque loads on the welding machine the initial axial load should be small. In other words an extended "slope-in" is required for the axial load. In the case of soft materials such as the light alloy used, in larger sizes the burn off rate is of course very low and hence the slope-in pressure must be extended to time periods of the order of 10 secs. and upwards. For sizes of interface larger than some 75 mm dia. the "slope-in" may be aided by chamfering one of the weld specimens down to some 75 mm dia. which in effect reduces the area presented to the friction interface at the earlier stages in the complete weld cycle.

Figure 17:
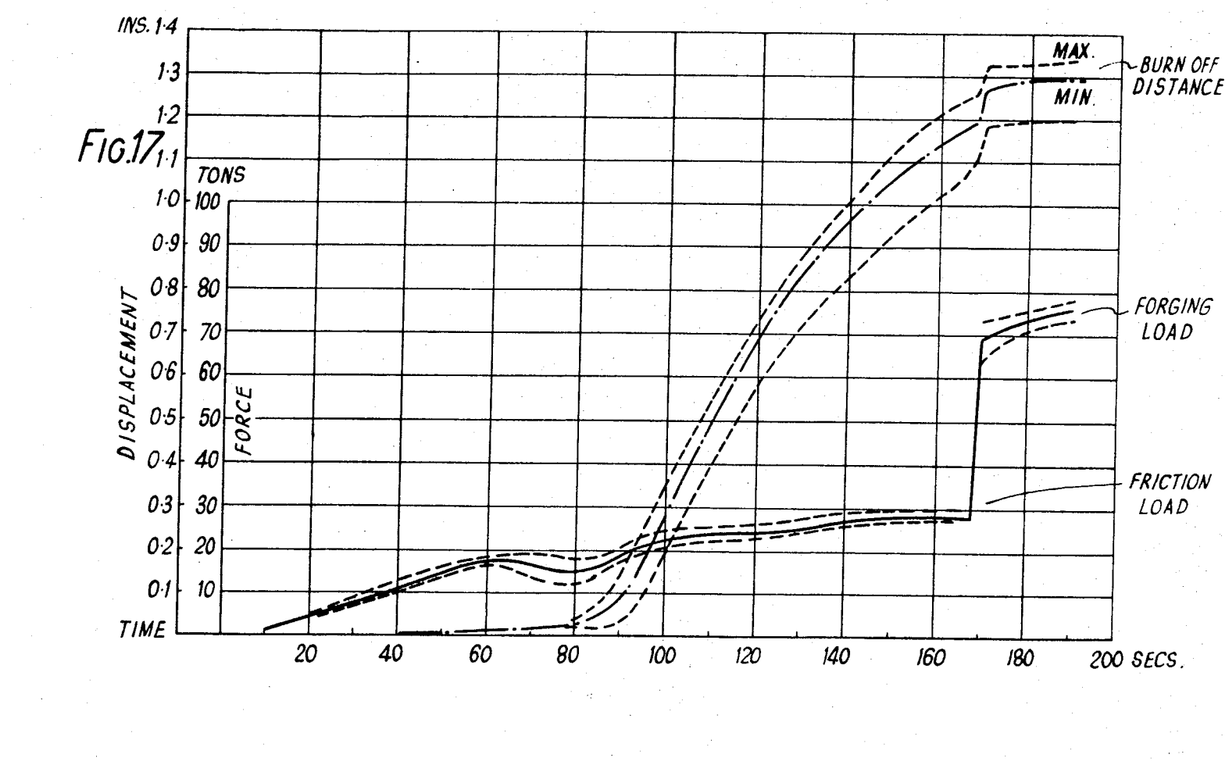
FIG. 17 shows graphically the progression of welding parameters with time.

FIG. 17 shows some typical graphs of friction load and forging load plotted against time, superimposed upon graphs of burn off distance plotted on the same time scale for some typical examples of welding aluminium alloys to steel. In each case there is shown a curve in chain dotted line indicating an average value with a dotted curve above and below showing maximum and minimum values.

It has been found preferable to control the axial feed of the faces to be welded, that is to say the "burn-off" distance, with time during the welding process to produce graphs illustrated with the friction load being achieved a consequence of the axial feed. In an alternative arranged it is possible to control the application of friction load to produce the graphs illustrated with the axial feed being achieved as a consequence of the application of friction load. It will be noted that in each case illustrated in FIG. 17, the final burn off distance is at least 1.1 inches.

This invention can also be applied to large diameter hollow workpieces, especially where the wall thickness is large.

References made above in specification:
1. M.B. Hollander — British Pat. No. 1,002,255
2. & 3. Shtemin and Prokofier — "The friction welding of Aluminium to steel and copper" Star. Prioz 1961 No. 11. pp. 30.32
4. Oberle — Report on Lecture given previously, in May, 1970, issue of "Metal Construction and British Welding Journal" published by the Welding Institute.

We claim:

1. A method of friction welding together faces of two members formed of dissimilar metals liable to form intermetallics at the weld interfaces, which method comprises causing relative rotation between the two faces by a continuous drive means while applying a load between the two faces in a direction axial of the rotation and maintaining that axial load and rotation for a determined period of time, and thereafter ceasing relative rotation and applying a forging load greater than the said axial load, wherein the maximum relative velocity between the faces during the rotation is in the range of 30 to 60 centimetres per second so as to minimise the formation of intermetallics at the interface.

2. A method of friction welding together a face of an aluminium alloy member and a face of a steel member comprising causing relative rotation between the two faces by a continuous drive means while applying load between the two faces in a direction axial of the rotation, maintaining that axial load and rotation for a determined period of time, and thereafter ceasing relative rotation and applying a forging load greater than the said axial load, wherein the maximum relative velocity between the faces during rotation is in the range of 30 to 60 centimetres per second and the axial welding load is such as to provide a pressure in the range 0.20 to 0.43 tons per square centimeter so as to form a strong ductile weld in which the formation of intermetallics does not extend to a depth of more than 10 microns over any significant area of the interface and does not exceed 2 microns over any large area.

3. A method of friction welding as claimed in claim 1, wherein said axial load is such as to provide a pressure in the range of 0.20 to 0.43 tons per square centimeter.

4. A method of friction welding as claimed in claim 3 wherein said forging load is such as to produce a pressure of at least 0.635 tons/sq. cms.

5. A method of friction welding as claimed in claim 1 wherein said determined time is in the range of 135 to 180 seconds.

6. A method of friction welding as claimed in claim 1 wherein said faces are initially left in rough cut condition and said maximum relative velocity is in the range of 30 to 45 centimeters per second.

7. A method of friction welding as claimed in claim 1 wherein said faces are initially of fine surface finish and said maximum relative velocity is in the range of 30 to 58 centimeters per second.

8. A method of friction welding as claimed in claim 2 wherein said axial pressure is in the range of 0.39 – 0.43 tons/sq. cms. and said maximum relative velocity is below 37 centimeters per second.

9. A method of friction welding as claimed in claim 2 wherein said axial pressure is in the range of 0.30 to 0.37 tons/sq.cms. and said maximum relative velocity is below 42 centimeters per second.

10. A method of friction welding as claimed in claim 2 wherein said axial pressure is in the range of 0.22 to 0.26 tons/sq. cms. and said maximum relative velocity is in the range of 36 to 57 centimeters per second.

11. A method of friction welding as claimed in claim 1 wherein said axial load is applied gradually to build up to a maximum value.

12. A method as claimed in claim 1 wherein the ratio of said axial load to the area of the weld to be formed is substantially between 0.20 and 0.23 tons/square centimeter.

13. A method as claimed in claim 1 wherein said forging load is substantially four times said axial load.

14. A method as claimed in claim 1 wherein the ratio of said forging load to the area of the weld to be formed is substantially between 0.81 and 0.91 tons/square centimeter.

15. A method as claimed in claim 1 wherein the axial relative displacement of said members is controlled with respect to time during said determined period of time.

16. A method as claimed in claim 1 wherein said axial load is controlled in value with respect to time during said determined period of time.

17. A method as claimed in claim 1 wherein the face of the softer of the two members is initially made to be of a lesser area than the area of the intended finished weld by chamfering that softer member.

18. A method according to claim 1 in which the initial cross-sectional area of each of the members being welded together is at least as great as that of a 75 mm. diameter bar.

* * * * *